No. 777,383.

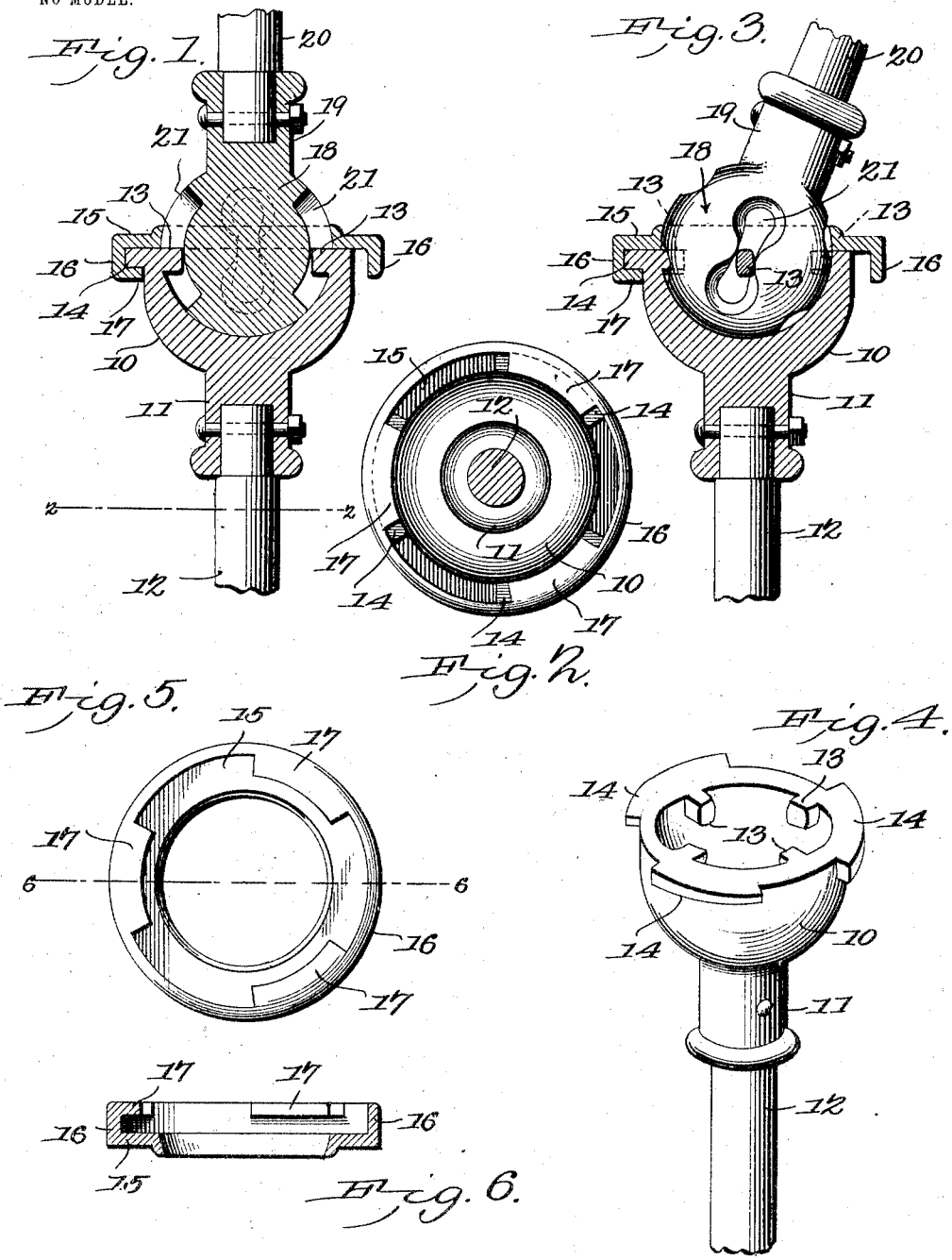

Patented December 13, 1904.

UNITED STATES PATENT OFFICE.

CHRIST MATSON AND PETER ROBERTSON, OF RACINE, WISCONSIN.

COUPLING.

SPECIFICATION forming part of Letters Patent No. 777,383, dated December 13, 1904.

Application filed June 6, 1904. Serial No. 211,423. (No model.)

*To all whom it may concern:*

Be it known that we, CHRIST MATSON and PETER ROBERTSON, citizens of the United States, residing at Racine, in the county of Racine and State of Wisconsin, have invented a new and useful Coupling, of which the following is a specification.

This invention relates to that form of shaft-couplings known as "universal," and has for its object to improve the construction and increase the efficiency and at the same time decrease the expense of manufacture.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a longitudinal sectional elevation. Fig. 2 is an end view with one shaft portion in section on the line 2 2 of Fig. 1. Fig. 3 is a side elevation with the socket member and locking-ring in section. Fig. 4 is a perspective view of the socket member detached. Fig. 5 is a plan view of the locking-ring detached. Fig. 6 is a transverse section of the locking-ring on the line 6 6 of Fig. 5.

The improved device comprises a socket member 10, having a semispherical cavity in one end, with means, such as an integral hub or sleeve 11, for receiving the shaft-section 12. Projecting inwardly from the outer face of the socket member are spaced lugs 13, and likewise projecting circumferentially from the socket member are rib-sections 14, inclined on one side, as shown in Fig. 4. Inclosing the open end of the socket member is an annular plate 15, having a flange 16 extending for a distance over the outer face of the socket and provided with inwardly-extending rib-sections 17, corresponding to and adapted to be engaged by the rib-sections 14 of the socket member, the inclined faces of the socket-ribs 14 passing beneath the rib-sections 17 of the flange 16 and firmly binding the socket and annular frame together. The aperture in the annular plate is smaller than the socket-cavity and is formed semispherical upon the interior and concentric to the socket-cavity to support a ball 18, secured, as by an integral sleeve 19, to a shaft-section 20. The ball 18 closely fits the semispherical cavity in the socket 10 and is provided with grooves or channels 21 to receive the studs 13 of the socket member.

In assembling the improved device the ball member 18 is placed in position in the socket member 10 and the locking-ring 15 then placed over the ball, with the ribs 17 opposite the spaces between the ribs 14 of the socket member, and then rotated a short distance to force the wedge-shaped ribs beneath the ribs 17, with the result of firmly locking all the parts together, while at the same time leaving the ball member free to swing in the socket to the limit of the slots 21, as above noted.

The side walls of the channels 21 are curved inwardly, and the sides of the studs 13 are likewise curved outwardly, so that as the ball 18 is rotated in the socket, with the shaft-sections 20 at an angle to the shaft-section 12, the curved sides of the channels will roll with the minimum of friction upon the curved sides of the studs as the socket member, together with its shaft-section 12, is carried around with the ball in the same manner as the teeth of an ordinary pair of gears operate. By this simple means the action is smooth and substantially noiseless and with a comparatively slight loss of power from friction.

The parts may be cast complete and will not generally require finishing or machine work of any kind, except the drilling of the sleeves 11 19 for the shaft-sections.

The device may be of any required size to adapt it to all sizes of shafts.

It will thus be noted that a very simply constructed, inexpensive, and efficient coupling is produced, which may be readily applied and employed wherever universal couplings are required.

Having thus described the invention, what is claimed is—

1. A universal coupling comprising a semispherical socket having a plurality of inwardly-extending lugs with convexed sides, a ring-frame having a central aperture of less diameter than the socket-cavity for detachable connection with said socket, and a ball for attachment to a shaft-section and having a plurality of spaced channels corresponding to and adapted to receive said convexed lugs and with the side walls of the channels curving inwardly, whereby the parts interengage with the minimum of friction during the action of the coupling.

2. A universal coupling comprising a semispherical socket member for engagement to a shaft-section and having a plurality of inwardly-extending lugs and a plurality of outwardly-extending inclined rib-sections, a ring-frame for inclosing said socket member and provided with inwardly-extending rib-sections for interlocking engagement by said inclined socket rib-sections and having a central aperture of less diameter than the interior of said socket, and a ball member for attachment to a shaft-section and movably engaging said socket and ring-aperture and provided with longitudinal channels for receiving said socket-lugs.

3. A universal coupling comprising a semispherical socket member for engagement to a shaft-section and having a plurality of inwardly-extending lugs with convexed sides and a plurality of outwardly-extending inclined rib-sections, a ring-frame for inclosing said socket member and provided with inwardly-extending rib-sections for interlocking engagement by said inclined socket rib-sections and having a central aperture of less diameter than the interior of said socket, and a ball member for attachment to a shaft-section and movably engaging said socket and ring-aperture and provided with longitudinal channels having inwardly-curving side walls for receiving said socket-lugs, whereby the parts operate with the minimum of friction.

In testimony that we claim the foregoing as our own we have hereto affixed our signatures in the presence of two witnesses.

CHRIST MATSON.
PETER ROBERTSON.

Witnesses:
NELS CHRISTENSEN,
LOUIS ANDERSEN.